United States Patent [19]

Azemar et al.

[11] 4,045,185

[45] Aug. 30, 1977

[54] AUTOCLAVE

[75] Inventors: Michel Azemar, Soucieu-en-Jarrest; Lucien Vigliecca, Venissieux, both of France

[73] Assignee: Rhone-Poulenc Industries, Paris, France

[21] Appl. No.: 734,084

[22] Filed: Oct. 20, 1976

[30] Foreign Application Priority Data

Oct. 21, 1975 France .................. 75.32124

[51] Int. Cl.² .................. B01J 3/00; B01F 7/16
[52] U.S. Cl. .................. 23/290; 23/285; 259/8; 259/105
[58] Field of Search .................. 23/285, 290; 259/122, 259/184, 191, 192; 526/344

[56] References Cited

U.S. PATENT DOCUMENTS

| 1,934,309 | 11/1933 | Hoover | 23/285 |
| 3,343,922 | 9/1967 | Zimmer et al. | 23/285 |
| 3,749,555 | 7/1973 | Beckmann et al. | 23/285 |
| 3,799,917 | 3/1974 | Rathke | 23/285 X |
| 3,877,881 | 4/1975 | Ono et al. | 23/285 |
| 3,893,811 | 7/1975 | Good et al. | 23/285 |

*Primary Examiner*—Morris O. Wolk
*Assistant Examiner*—Roger F. Phillips
*Attorney, Agent, or Firm*—McDougall, Hersh & Scott

[57] ABSTRACT

An autoclave for the bulk polymerization of vinyl chloride polymers and copolymers comprising a vessel having one or more agitators in the form of a shaft mounted for rotational movement about a vertical axis and having a helicoidal ribbon, the upper and lower surfaces $S_1 S_2$ of which are generated by displacement of a straight segment of a line of substantially constant length, when one of the ends describes a helix on a cylinder which forms a surface of the rotatable shaft, said segments being situated during their displacment in planes tangential to said cylinder and forming respectively with the planes perpendicular to the axis of the rotatable shaft, constant angles $\phi_1$ and $\phi_2$.

11 Claims, 14 Drawing Figures

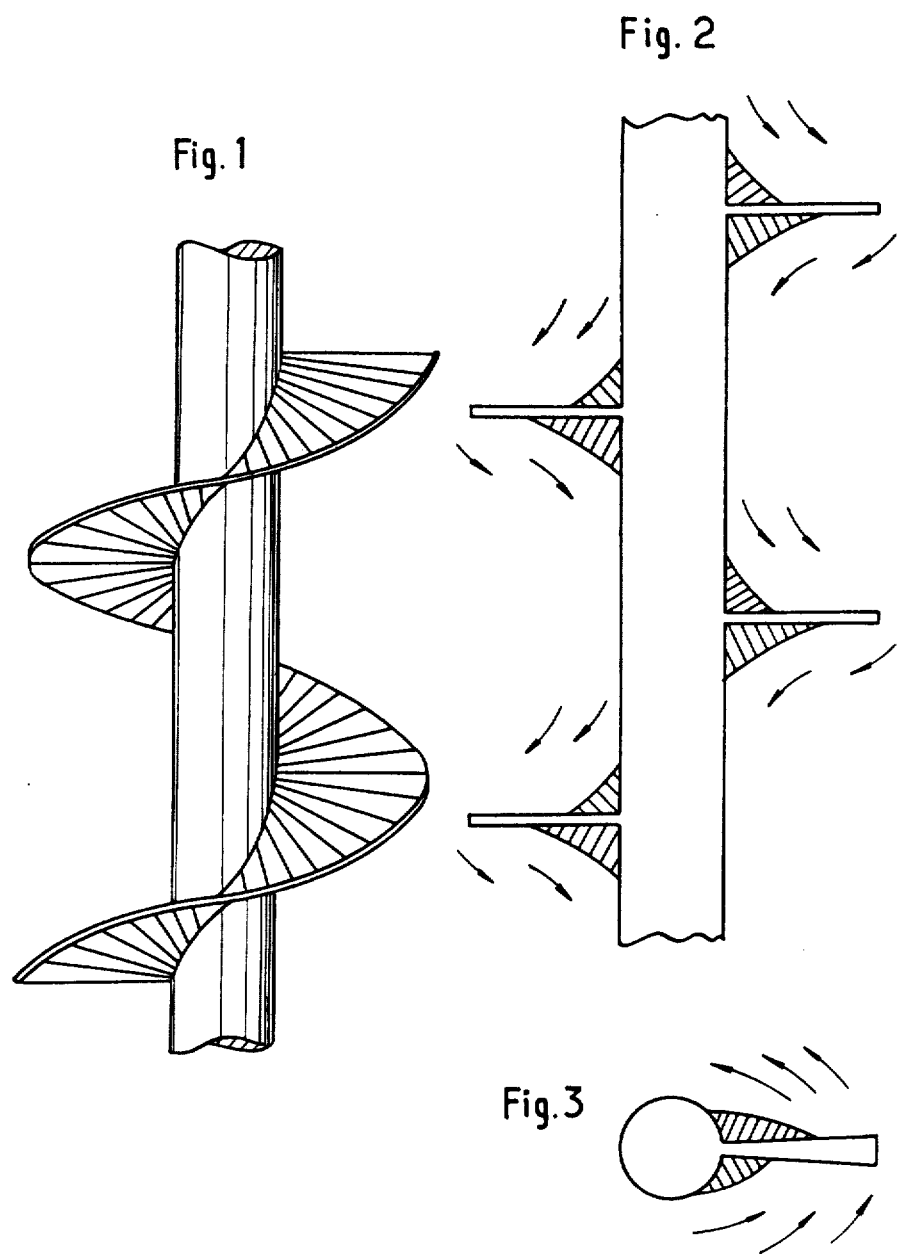

AUTOCLAVE

The present invention relates to an autoclave for preparation in bulk of polymers and copolymers based on vinyl chloride. It also relates to the method of preparing polymers and copolymers based on vinyl chloride by bulk polymerization in such an autoclave.

BRIEF DESCRIPTION OF THE DRAWINGS

FIG. 1 is a side elevational view of a prior art agitator;

FIG. 2 is a sectional view of the agitator shown in FIG. 1 taken in a plane containing the axis of the rotating shaft;

FIG. 3 is a sectional view of the agitator shown in FIG. 1 taken in a plane perpendicular to the axis of the rotating shaft;

Figure 4:
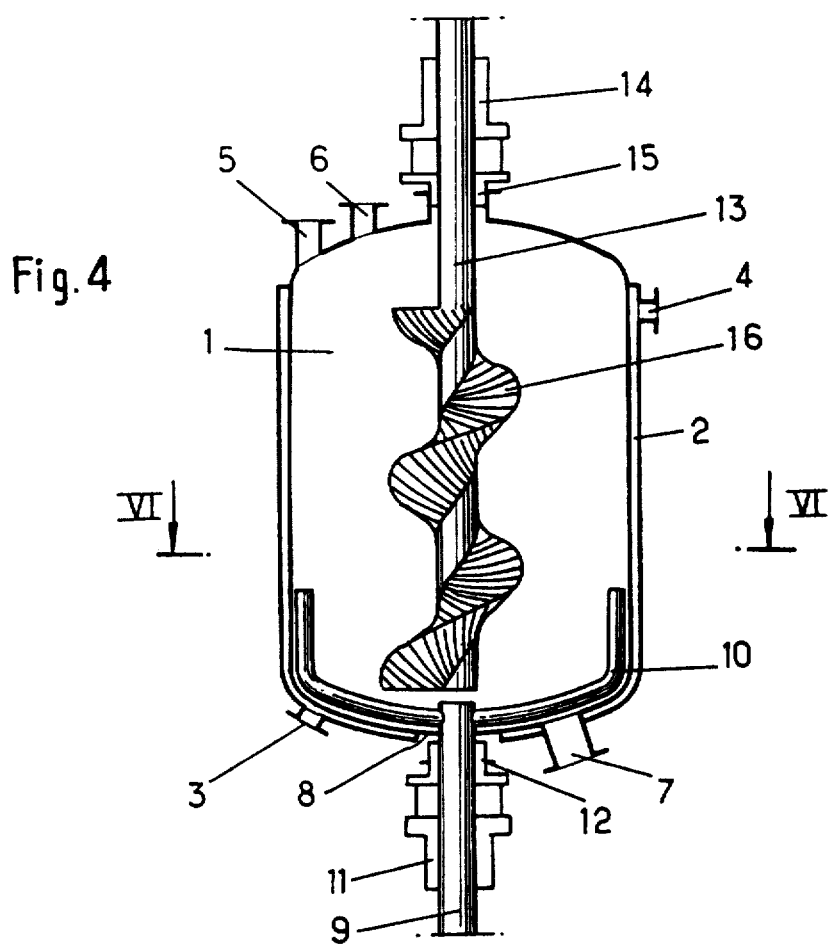
FIG. 4 is a vertical sectional view of one embodiment of the invention taken along the axis of the autoclave.

It has previously been suggested to carry out preparation, in bulk, of polymers and copolymers based on vinyl chloride in two stages, in separate apparatus by a process consisting of carrying out in a first stage, referred to as prepolymerization, a limited polymerization under agitation at high turbulence until there is obtained a degree of conversion of the monomer or monomers of the order of 7 to 15%, then carrying out in a second stage the final polymerization at a slow agitation rate, this rate however remaining sufficient to insure good temperature control for the reaction medium up to the end of the polymerization or copolymerization reaction.

This method and its variants have been described in French Patents and Certificates of Addition, namely: Nos. 1,382,072, 84,958, 84,965, 84,966, 85,672, 89,025 and Nos. 1,436,744, 87,620, 87,623, 87,625 and 87,626.

In one process, the final polymerization operation is carried out in a vertical autoclave of the type described in the copending application Ser. No. 442,372, filed Feb. 14, 1974, and entitled "Vertical Autoclave for Bulk Polymerization of Vinyl Based Polymers and Copolymers", in which the autoclave is provided with an agitating device comprising at least one agitator formed by a ribbon wound in helicoidal turns on a rotating shaft passing through the upper part of the autoclave.

The upper surface and lower surface of the ribbon of the agitators of this type are surfaces each of which are formed by displacement of a segment of a line of constant length when one of the ends describes a helix on a cylinder which forms the surface of the rotating arm, said segment being situated constantly during its displacement in a plane containing the axis of the shaft and forming a zero angle with a plane perpendicular to said axis. An agitator of this type is shown in FIGS. 1 to 3 of the drawings.

Said agitators have the following disadvantages:

A large formation of solid matter on the surface of the agitator due to the existence of zones which are not agitated with the rotating agitator, represented by the hatched parts in FIGS. 2 and 3. This formation of solid matter, which is very large when the agitator is cooled or heated by circulation of fluid, has further the disadvantage of reducing the heat exchange efficiency between the agitator and the reaction medium.

Existence of sharply angled welded zones between the ribbon and the rotating arm having a poor surface state, which favors adhesion of the polymer and in which such conditions become greater as the zones which are not agitated are formed about said welding zones.

Difficulty of cleaning the agitator due to the existence of points of increased anchoring in the zones of welding and the sharp angle of connections between the rotating arm and the ribbon.

The autoclave embodying the features of this invention is intended to reduce or avoid these disadvantages and it is an object of this invention to produce an autoclave embodying such features.

According to one aspect of the invention there is provided an autoclave for bulk polymerization of polymers and copolymers based on vinyl chloride comprising a vessel containing at least one agitator consisting essentially of a ribbon wound in helicoidal turns on a substantially vertical rotatable shaft, the upper surface and the lower surface of said ribbon being respectively surfaces $S_1$ and $S_2$, each being generated by displacement of a straight segment of a line of substantially constant length, when one of the ends describes a helix on a cylinder which forms a surface of the rotatable shaft, said segments being always situated during their displacement in planes tangential to said cylinder and forming constant angles $\phi_1$ and $\phi_2$ respectively with the planes perpendicular to the axis of the rotatable shaft.

The angles $\phi_1$ and $\phi_2$ are relative respectively to the upper face $S_1$ and the lower surfaces $S_2$ of the ribbon.

In a practical embodiment of the invention, the ratio of the pitch $h$ of the helices to the diameter of the agitator is from 0.5 to 5, the angles $\phi_1$ and $\phi_2$ between $-70°$ and $+70°$ and the ratio of the diameter of the rotatable shaft to the diameter of the agitator from 0.05 to 0.9. The pitch $h$ may be constant or variable along the rotatable shaft.

According to one embodiment of the invention, a single agitator is used and its rotatable shaft is oriented along the axis of the autoclave and integral with an arm conforming to the shape of the bottom of the vessel to sweep the bottom. In this embodiment, the shaft may pass the upper part and/or the bottom of the vessel and the ratio of the diameter of the agitator to the diameter of the vessel is generally from 0.25 to 0.7.

In another embodiment of the invention, the agitator or agitators pass through the upper part of vessel and the vessel is provided with at least one arm conforming to the shape of the bottom of the vessel and connected to a shaft passing through the bottom of the vessel along its axis, to sweep the bottom.

The agitator or agitators may be hollow and formed to circulate a heat exchange fluid therethrough.

For purposes of illustration, but not of limitation, embodiments of the invention will now be described with reference to FIGS. 4 to 14 of the accompanying drawings.

Figure 6:
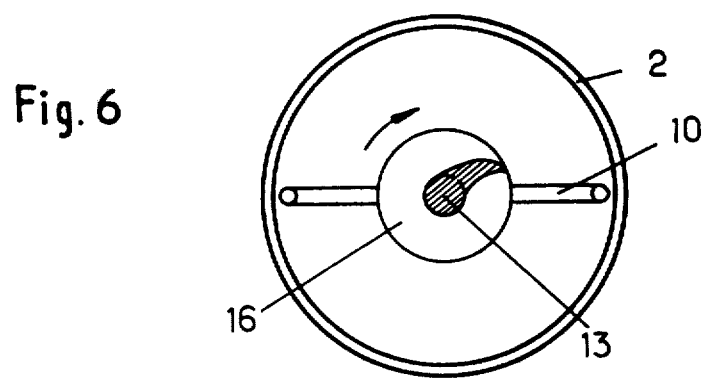
FIG. 6 is a sectional view taken along line VI—VI of FIG. 4.

In FIGS. 4 and 6 the agitation device in the autoclave comprises a single agitator.

Figure 7:
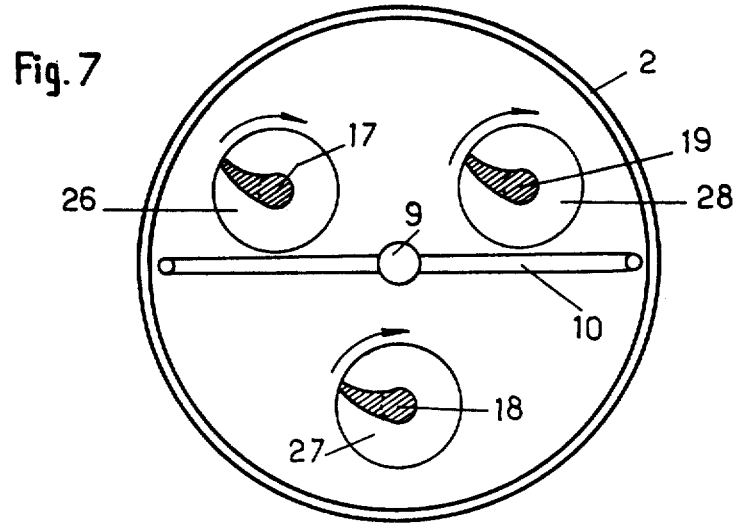
FIG. 7 is a sectional view taken along line VII—VII of FIG. 5.

In FIGS. 6 and 7 the agitation device comprises three agitators;

FIGS. 8 to 14 are views of parts of agitators.

Figure 9:
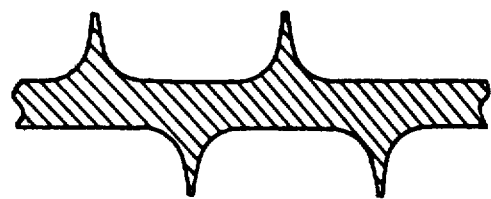
Figure 10:
Figure 8:
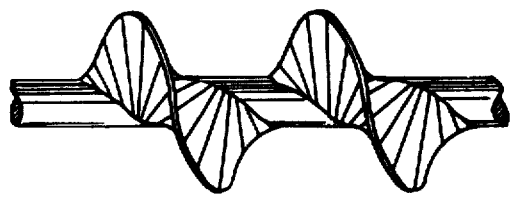
FIG. 8 is a side elevational view of one embodiment of the agitator of the invention.

In the case of FIGS. 9 and 10, the angles $\phi_1$ and $\phi_2$ are zero.

Figure 11:
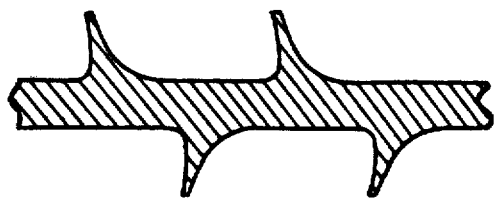
Figure 12:

In the case of FIGS. 11 and 12, the angles $\phi_1$ and $\phi_2$ are 15°.

Figure 13:
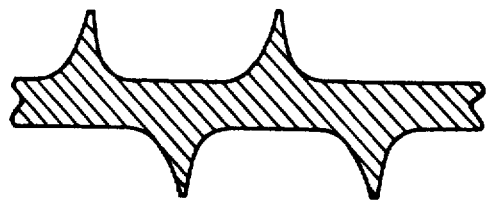
FIGS. 9, 11, and 13 are sectional views of three embodiments of the agitator of the invention similar to that of FIG. 8, each taken in a plane containing the axis of its rotatable shaft.
Figure 14:
FIGS. 10, 12, and 14 are sectional views corresponding to those of FIGS. 9, 11, and 13, respectively, taken perpendicular to the axis of the rotatable shafts.

In the case of FIGS. 13 and 14, the angle $\phi_1$ is 10° and the angle $\phi_2$ is zero.

Referring to FIG. 4, the autoclave 1, having a vertical axis, is surrounded by a jacket 2 for circulation of a heat exchange fluid entering by a duct 3 and leaving by a duct 4. The autoclave 1 is provided at its upper part with a duct 5 for feeding prepolymer, the necessary reactants and possibly a monomer and a duct 5 for removing monomeric composition which has not reacted at the end of the operation. At the lower part of the autoclave 1 there is provided a duct 7 for discharge of the polymer formed.

The bottom 8 of the autoclave 1 is traversed by a spindle 9 to which are connected two arms 10 and which is supported for rotational movement by the bearing 11, the fluid tightness between the spindle and the bottom of the autoclave being assured by a liquid tight device 12 in the form of a stuffing box or a mechanical gasket.

In FIGS. 4 and 6, the upper part of the autoclave 1 is traversed on its axis by a rotatable shaft 13 for rotational movement by the bearing 14, the fluid tightness between the rotatable shaft and the upper part of the autoclave being assured by means of a fluid tight device (stuffing box or gasket) 15. On the rotatable shaft, a ribbon 16 is wound in helicoidal turns.

Figure 5:
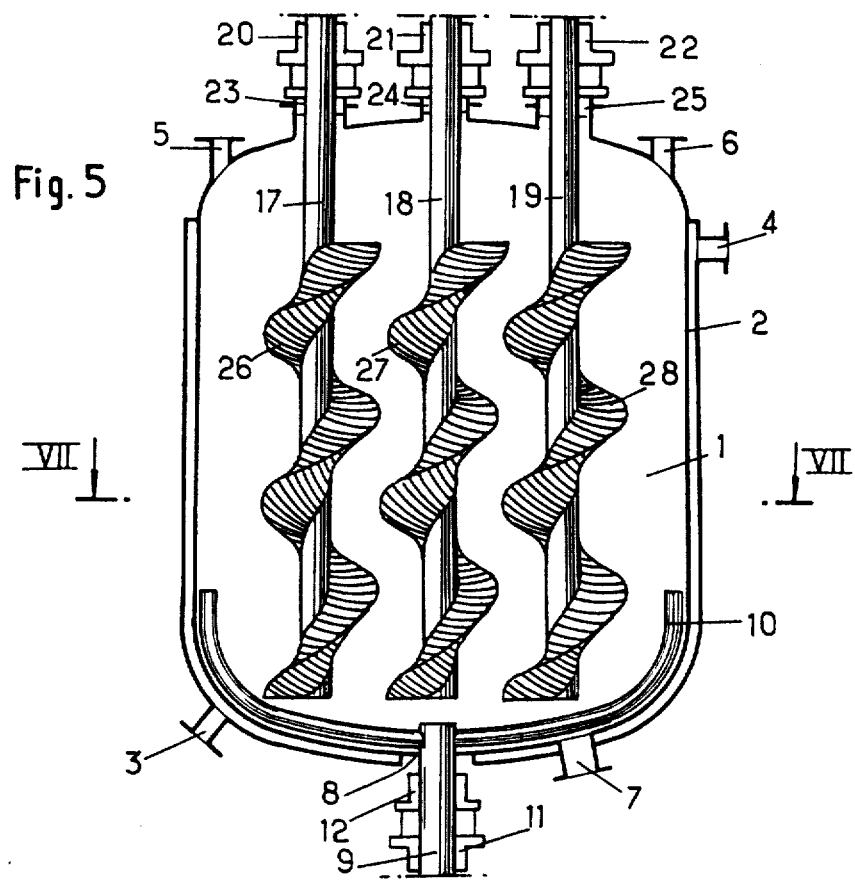
FIG. 5 is a sectional view similar to that of FIG. 4 of another embodiment of the invention.

In FIGS. 5 and 7, the upper part of the autoclave 1 is traversed by three rotatable shafts 17, 18 and 19 equidistant from the axis of the autoclave and arranged on apices of an equilateral triangle and supported respectively by the bearings 20, 21 and 22, the fluid tightness between the rotatable shafts and the upper part of the autoclave being assured by means of fluid tight devices (stuffing boxes or gaskets) 23, 24 and 25. On the rotatable shafts 17, 18 and 19, the ribbons 26, 27 and 28 are respectively wound in helicoidal turns.

Such as autoclave has the following advantages for carrying out the operation of final polymerization, in a process for preparing in bulk polymers and copolymers based on vinyl chloride in two stages in separate apparatus.

Absence of non-agitated zones rotating with the agitator. The absence of an acute angle between the rotatable shaft and the ribbon imparts regular movement in the reaction medium with reduction or even complete suppression of discontinuities in the flow of said medium in the neighborhood of the rotatable shaft. The entire surface of the agitator which is immersed in the reaction medium imparts a shearing effect which is practically constant which gives a reduction or even complete suppression of adherence of the material to the agitator since the latter is continuously renewed on all the surface of this part of the agitator. This effect is enhanced by the fact that there are no longer welded zones of acuate angle. The large dead zone which normally appears against the lower surface of the ribbon, in the case of agitators of the type shown in FIGS. 1 to 3, may be reduced at will and may be completely avoided by appropriate choice of the value of the angle $\phi_2$.

Improvement in heat exchange between the reaction medium and the agitator.

Ease of cleaning of the agitator resulting from the absence of points of adhesion and good accessibility of the whole surface.

Possibility to have an excellent yield from the agitator by increase of the angle $\phi_1$.

Possibility of improving the definition of the agitation required by appropriate choice of the pitch $h$ and the angle $\phi_1$.

It should also be noted that, for certain values of the angles $\phi_1$ and $\phi_2$, a function only of the ratio of the pitch $h$ to the diameter of the rotatable shaft, the surface $S_1$ and $S_2$ may be developed. Thus the ribbon may be made by assembly of two elements obtained by deforming a flat plate, by simply twisting said plate once it is cut to shape. This is not the same for the ribbon of the type shown in FIGS. 1 and 3 for which the manufacture of elements from a flat plate is only possible by drawing the plate at certain locations and compressing it at others.

It will be understood that changes may be made in the details of construction, arrangement and operation, without departing from the spirit of the invention, especially as defined in the following claims.

We claim:

1. An autoclave for preparation in bulk of polymers and copolymers based on vinyl chloride comprising a vessel, at least one agitator mounted for rotational movement within said vessel consisting essentially of a ribbon wound in helicoidal turns on a substantially vertical rotatable shaft, the upper surface and the lower surface of said ribbon being respectively surfaces $S_1$ and $S_2$ each generated by displacement of a straight segment of a line of substantially constant length, when one of the ends describes a helix on a cylinder which forms a surface of the rotatable shaft, said segments being situated during their displacement in planes tangential to said cylinder, upper surface $S_1$ extending from the shaft at a negative angle $\phi_1$ with the plane perpendicular to the axis of the rotatable shaft and the lower surface $S_2$ extending at a positive angle $\phi_2$ with the plane perpendicular to the axis of the rotatable shaft.

2. An autoclave as claimed in claim 1, in which the ratio of the pitch $h$ of the helices to the diameter of the agitator is from 0.5 to 5, the angle $\phi_1$ ranges down to $-70°$, the angle $\phi_2$ ranging up to $+70°$ and the ratio of the diameter of the rotatable shaft to the diameter of the agitator is from 0.5 to 0.9.

3. An autoclave as claimed in claim 2, in which the pitch $h$ of the helices is constant along the rotatable shaft.

4. An autoclave as claimed in claim 2, in which the pitch $h$ of the helices varies along the rotatable shaft.

5. An autoclave as claimed in claim 1, in which the vessel contains one agitator, the shaft of which is aligned with the vertical axis of symmetry of the vessel and which includes an arm on the shaft which sweeps the bottom of the vessel as the agitator rotates.

6. An autoclave as claimed in claim 5, in which the shaft passes through the upper part of the autoclave.

7. An autoclave as claimed in claim 5, in which the shaft passes through the bottom of the autoclave.

8. An autoclave as claimed in claim 1, in which the ratio of the diameter of the agitator to the diameter of the vessel is from 0.25 to 0.7.

9. An autoclave as claimed in claim 1, in which the shafts of the agitators pass through the upper part of the vessel.

10. An autoclave as claimed in claim 1, in which at least one of the agitators is hollow and which includes means for circulating a heat exchange fluid through the hollow agitator.

11. An autoclave as claimed in claim 9 which includes a rotatable shaft which passes through the bottom of the vessel and an arm mounted on the rotatable shaft for sweeping the bottom of the vessel during rotational movement of the rotatable shaft.

* * * * *